United States Patent [19]
Pepi et al.

[11] Patent Number: 4,861,075
[45] Date of Patent: Aug. 29, 1989

[54] COUPLING FOR RIGIDLY CONNECTING PIPE SECTIONS

[75] Inventors: Jerome S. Pepi, No. Attleboro, Mass.; Michael W. Horgan, Coventry, R.I.

[73] Assignee: Grinnell Corporation, Cranston, R.I.

[21] Appl. No.: 208,976

[22] Filed: Jun. 20, 1988

[51] Int. Cl.⁴ ............................................. F16L 17/00
[52] U.S. Cl. ..................................... 285/112; 285/373; 24/279
[58] Field of Search ............... 285/112, 373, 419, 367; 24/279, 280, 282, 20 LS

[56] References Cited

U.S. PATENT DOCUMENTS

| | | | |
|---|---|---|---|
| 1,928,453 | 10/1934 | Flynn | 285/367 |
| 2,842,383 | 7/1959 | Merrill | 24/279 |
| 3,054,629 | 9/1962 | Piatek | 285/373 |
| 3,251,615 | 5/1966 | Short | 285/373 |
| 4,310,956 | 1/1982 | Mectstroth et al. | 24/201 S |
| 4,408,788 | 10/1983 | Beutema | 285/367 X |
| 4,611,839 | 9/1986 | Rung et al. | 24/279 X |
| 4,702,499 | 10/1987 | de Raymond et al. | 285/112 |

Primary Examiner—Joseph Falk
Attorney, Agent, or Firm—Salter & Michaelson

[57] ABSTRACT

A coupling construction includes a plurality of coupling segments which are receivable in substantially end-to-end encircling relation around the end portions of a pair of grooved pipe sections and a plurality of nut-and-bolt assemblies for securing the coupling segments together. The coupling segments include arcuate main portions, apertured flanges which extend outwardly from opposite ends of the main portions and spaced first and second ridges which extend inwardly from the inner sides of the main portions and are receivable in annular grooves in the pipe sections. The apertures in adjacent flanges are offset from each other in a direction substantially parallel to the Z—Z axis of the coupling so that tightening of the nut-and-bolt assemblies causes adjacent flanges to be drawn into predetermined offset positions before the end faces of the coupling segments are drawn into engagement. When the adjacent flanges are in the offset positions thereof, opposite end portions of the ridges are urged against opposite side edges of the grooves to secure the pipe sections in predetermined closely spaced, aligned positions. The adjacent end faces of the coupling segments are disposed in angular planes and they are engageable in face-to-face relation so that they cooperate with nut-and-bolt assemblies to provide a wedging action for retaining the adjacent ends of the coupling segments in offset positions.

8 Claims, 3 Drawing Sheets

COUPLING FOR RIGIDLY CONNECTING PIPE SECTIONS

BACKGROUND AND SUMMARY OF THE INVENTION

The instant invention relates to pipe couplings and more particularly to a pipe coupling which is operative for rigidly securing a pair of grooved pipe sections together in closely spaced, substantially aligned relation.

Pipe couplings of the general type which are receivable in engagement in annular grooves adjacent the ends of pairs of pipe sections for securing the pipe sections together have been heretofore available for many years; and in this regard, the devices disclosed in the U.S. Pat. Nos. to FLYNN, #1,978,453; PIATEK, #3,054,629; SHORT, #3,251,615; and BEUKEMA, #4,408,788, are exemplary of pipe couplings of this general type. However, while couplings of this general type have been found to be capable for effecting connections between the adjacent ends of pairs of pipe sections, they have generally only been operative for effecting flexible connections wherein slight amounts of both axial and lateral or bending movement, as well as slight amounts of rotational movement, are possible between connected pipe sections. In this regard, it has been found that in many cases slight degrees of flexibility between connected pipe sections can be tolerated without adverse effects, and that in certain applications, slight degrees of flexibility may even be desirable. However, more recently, it has been found that substantially rigid connections between pipe sections are preferable for certain types of piping systems and, therefore, a need has developed for a pipe coupling which can be effectively utilized for rigidly securing the adjacent ends of a pair of grooved pipe sections together in substantially aligned relation.

The coupling disclosed in the U.S. Pat. No. to RUNG et al, #4,611,839, is generally operative for providing a substantially more rigid connection between a pair of pipe sections; and it represents the closest prior art to the subject invention of which the applicant is aware. However, since the device disclosed in the U.S. Pat. No. to RUNG et al differs both conceptually and structurally from the coupling of the subject invention, it is believed to be only of general interest with respect thereto.

The instant invention provides a highly effective coupling which is adapted for rigidly securing the adjacent ends of a pair of grooved pipe sections together in substantially aligned relation. More specifically, the coupling construction of the instant invention comprises a plurality of coupling segments, each coupling segment including an arcuate main portion, a pair of apertured flanges extending outwardly from opposite ends of the main portion thereof and axially spaced first and second engagement means extending substantially radially inwardly from the main portion, and means for securing the coupling segments in encircling relation around a pair of pipe sections so that the engagement means of the coupling segments are received in the annular grooves in the pipe sections. The coupling segments are formed so that the apertures in adjacent flanges are offset from each other in a direction substantially parallel to the Z—Z axis of the coupling when the adjacent flanges are in substantially aligned relation, and the securing means are received in the apertures in adjacent flanges for first drawing the adjacent end flanges into offset positions wherein they are offset from each other in a direction substantially parallel to the Z—Z axis of the coupling and for then drawing the adjacent flanges together. When the coupling segments are secured on a pair of grooved pipe sections in this manner, opposite end portions of the engaging means of the coupling segments are urged against opposite side edges of the grooves in which they are received for rigidly securing the pipe sections together in substantially aligned relation. In this regard, the engaging means are preferably formed as spaced first and second inwardly extending ridges on the inner sides of the main portions of the coupling segments which are engageable with the side edges of the grooves. The coupling segments are preferably formed with end faces at the opposite ends thereof, and the end faces are preferably formed so that when the coupling segments are received in assembled relation, adjacent end faces are engageable and frictionally retained in nonslidable relation for retaining the adjacent ends of the coupling segments in offset relation. Further, the end faces are preferably formed so that they are engageable along planes which extend at acute angles to the Y-Z plane of the coupling and which are substantially perpendicular to the X-Z plane of the coupling, and the securing means perferably comprise threaded nut-and-bolt assemblies which are assembled through the apertures in adjacent flanges. Further, the end faces are oriented so that they cooperate to produce a wedging action which causes a stretching force to be applied to the securing means if a force is applied to the coupling which would tend to move the adjacent flanges back into alignment. The flanges are preferably formed with recesses therein on the sides thereof which face away from the adjacent flanges, the recesses preferably extending around the apertures in the flanges, and the nuts and the head portions of the bolts of the nut-and-bolt assemblies are received in the recesses to retain the head portions of the bolts and nuts in substantially stationary positions relative to the flanges as the nut-and-bolt assemblies are tightened to move the flanges into offset positions.

It has been found that the coupling of the instant invention can be effectively utilized for rigidly securing the adjacent ends of a pair of grooved pipe sections together in substantially aligned relation. In this regard, it has been found that because the apertures in adjacent flanges are in offset positions when the flanges are in substantially aligned relation, the nut-and-bolt assemblies of the coupling are effectively operative for first moving the flanges into offset positions wherein the apertures in adjacent flanges are in substantially aligned relation and for then drawing the flanges together. As a result, the ridges on the inner sides of the flanges are not only effectively drawn into engagement with the inner surfaces of the grooves in the pipe sections, but the opposite end portions of the ridges are normally urged into engagement with the opposite side edges of the grooves in order to rigidly secure the pipe sections together. In this regard, because the ridges engage both the inner surfaces and the side edges of the grooves, the coupling segments are effectively operative for resisting relative axial movement, as well as relative lateral or bending movement, and they also frictionally grasp the pipe sections to resist relative rotational movement. Further, once the fastening means have been tightened to secure the coupling segments on the pipe sections, the angular end faces of the coupling segments are frictionally retained in position and they are also operative with a wedging action which further resists relative movement between the opposite end faces of the coupling segments. More specifically, because the end faces of the coupling segments are disposed in angular planes, they are operative with a wedging action which causes stretching forces to be applied to the fastening bolts when forces are applied to the coupling segments which would tend to force the opposite end portions of the ridges away from the opposite side edges of the grooves. Hence, the angularly disposed end faces on the adjacent ends of the coupling segments cooperate to maintain the opposite end portions of the ridges in engagement with the opposite side edges of the grooves in the pipe sections.

Accordingly, it is a primary object of the instant invention to provide an effective coupling for rigidly securing the adjacent ends of a pair of grooved pipe sections together.

Another object of the instant invention is to provide an effective coupling comprising a plurality of coupling segments having spaced first and second radially extending ridges on the inner sides thereof which are engageable with the opposite side edges of the annular grooves in a pair of grooved pipe sections to rigidly secure the pipe sections together.

Another object of the instant invention is to provide a coupling comprising a plurality of arcuate coupling segments having apertured flanges adjacent the opposite ends thereof and fastening bolts which are receivable in the apertures in the flanges for drawing them together, wherein the apertures in adjacent flanges are in offset relation when the flanges are in aligned relation so that adjacent flanges are first moved into offset positions and then drawn together as the fastening bolts are tightened.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
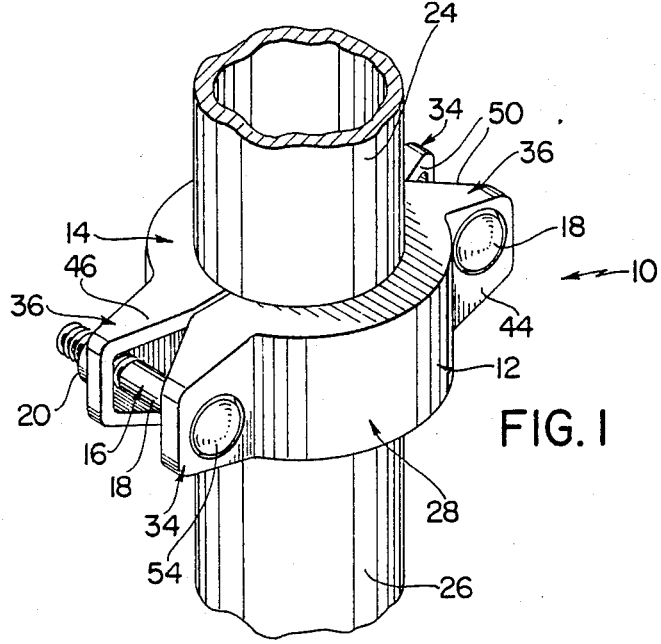
FIG. 1 is a perspective view of the coupling of the instant invention secured on a pair of grooved pipe sections.
Figure 2:
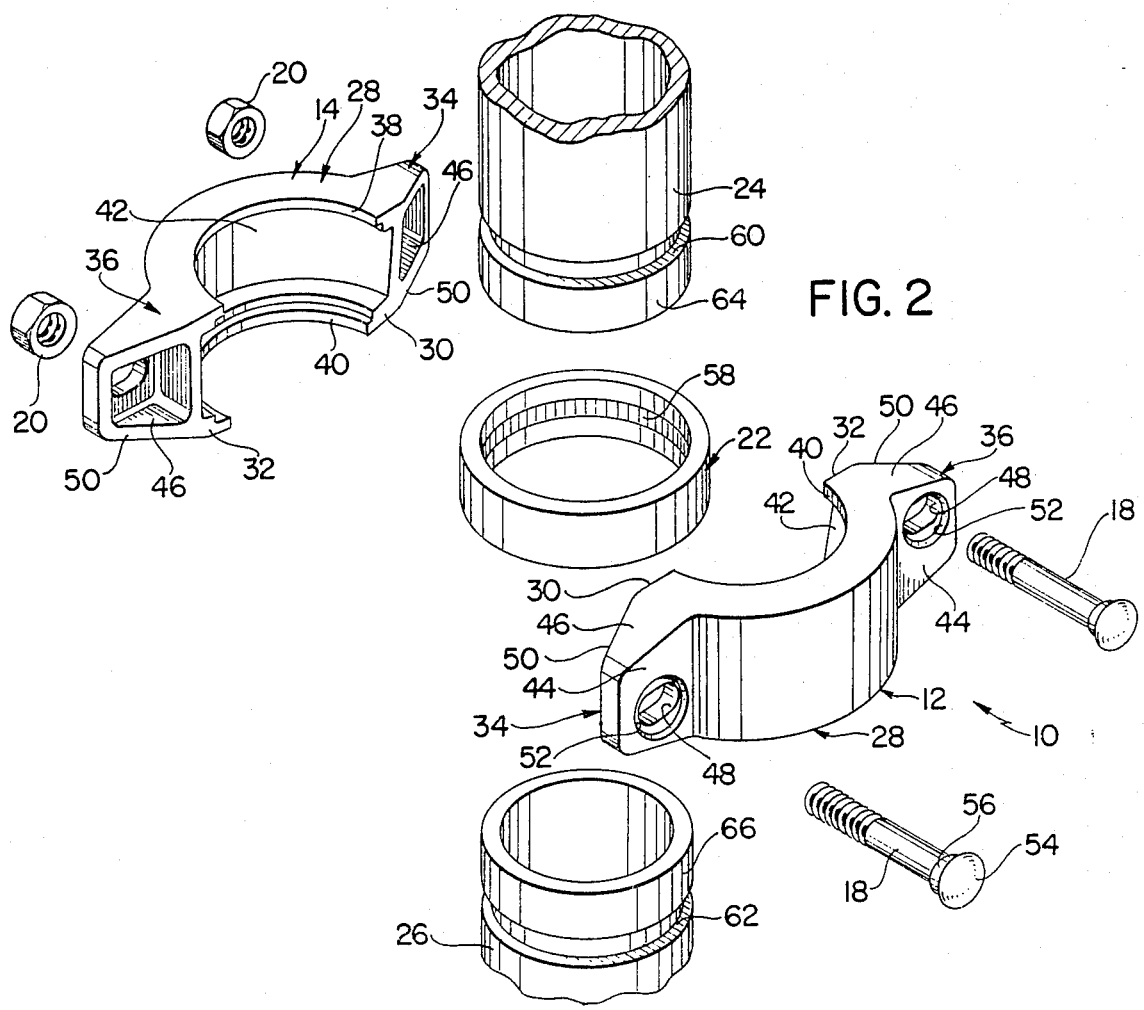
FIG. 2 is an exploded perspective view of the coupling with the pipe sections.
Figure 3:
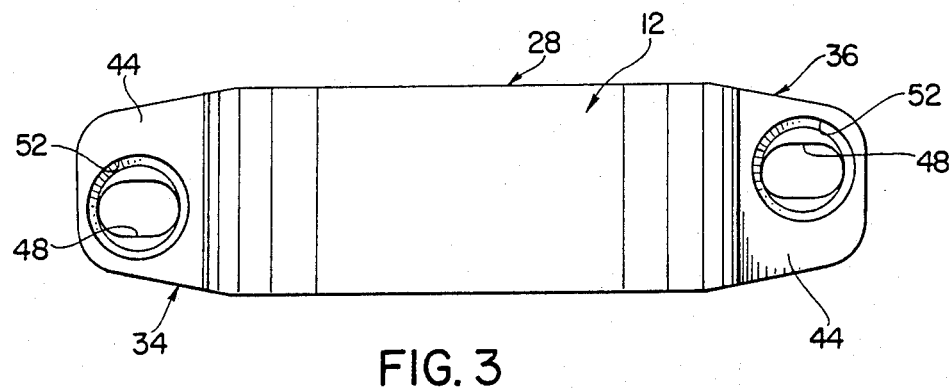
FIG. 3 is a side view of one of the coupling segments.
Figure 4:
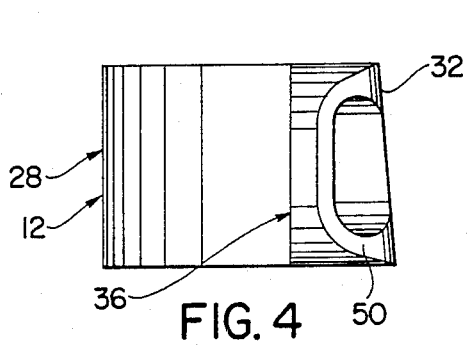
FIG. 4 is an end elevational view thereof.
Figure 5:
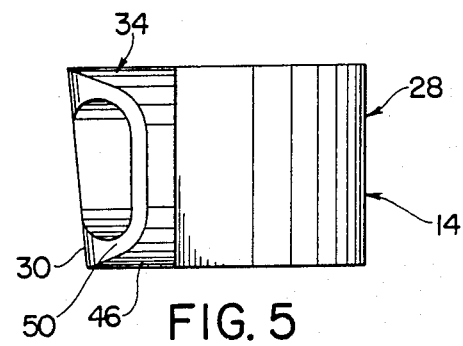
FIG. 5 is an opposite end elevational view thereof.

Referring now to the drawings, the coupling of the instant invention is illustrated and generally indicated at 10 in FIGS. 1, 2 and 6-10. The coupling 10 comprises first and second substantially arcuate coupling segments generally indicated at 12 and 14, respectively, a pair of fastening assemblies generally indicated at 16 comprising threaded bolts 18 and threaded nuts 20, and a rubberized seal ring generally indicated at 22. As illustrated in FIGS. 1, 2 and 6-10, the coupling 10 is operative for effecting a rigid connection between first and second grooved pipe sections 24 and 26, respectively, which is resistant to both axial and lateral relative movement, as well as to relative rotation.

The coupling segments 12 and 14 are preferably of identical configuration and they preferably each comprise a semicircular main portion 28 having opposite first and second end faces 30 and 32, respectively, and first and second flanges 34 and 36 which extend outwardly from the main portion 28 thereof adjacent the end faces 30 and 32, respectively, thereof.

The main portions 28 are of arcuate configuration and they each include spaced first and second arcuate inner ridges 38 and 40, respectively, which extend substantially radially inwardly from the inner sides thereof adjacent the opposite side edges thereof and an arcuate inner channel 42 between the ridges 38 and 40 thereof. As illustrated most clearly in FIGS. 6-8, the main portions 28 are preferably further formed so that the end faces 30 and 32 thereof are disposed in planes which are inclined at slight acute angles of approximately 5° to the Y-Z plane of the coupling 10, although the opposite end faces 30 and 32 are inclined in opposite directions as illustrated. Accordingly, the adjacent or opposing end faces 30 and 32 of the coupling segments 12 and 14 are normally disposed in substantially parallel relation and they normally meet in substantially face-to-face relation when the fastening assemblies 16 are tightened to bring the adjacent or opposing end faces 30 and 32 into engagement. However, because the end faces 30 and 32 are disposed at relatively slight angles to the Y-Z plane of the coupling 10, relative sliding movement between engaging end faces 30 and 32 is resisted by both a wedging effect and friction when the adjacent end faces 30 and 32 are in mating engagement, as will hereinafter be more fully set forth.

The flanges 34 and 36 are integrally formed with the main portions 28 of the coupling segments 12 and 14 so that they extend outwardly adjacent opposite ends of the main portions 28, and they comprise plate portions 44 and frame portions 46. The plate portions 44 are formed so that they are substantially parallel to the Y-Z plane of the coupling 10 when the coupling segments 12 and 14 are in assembled relation and they have apertures 48 therethrough. The frame portions 46 are integrally formed on the undersides of the plate portions 44 to add structural rigidity to the flanges 34 and 36. The frame portions 46 are formed so that the opposing faces of adjacent flanges 34 and 36 are defined by diverging surfaces 50 which extend angularly outwardly from the respective end faces 30 and 32 thereof. Accordingly, as illustrated most clearly in FIG. 1, when the coupling segments 12 and 14 are assembled together, adjacent flanges 34 and 36 diverge in their outward extents to permit the coupling segments 12 and 14 to be pivoted or hinged outwardly relative to each other when the bolt 18 is removed from one pair of adjacent flanges 34 and 36. The apertures 48 are of elongated configuration and they are oriented so that the elongated dimensions thereof extend substantially outwardly on the flanges 34 and 36, and recesses 52 having seating surfaces 51 and angularly disposed sidewalls are formed on the upper surfaces of the plate portions 44 around the apertures 48. As illustrated most clearly in FIGS. 3 and 6-10, the coupling segments 12 and 14 are formed so that the apertures 48 in the flanges 34 and 36 thereof are offset from each other in a direction which is substantially parallel to the axis of the coupling 10 (the Z axis). Accordingly, the apertures 48 in adjacent flanges 34 and 36 are disposed in offset relation when the adjacent flanges 34 and 36 are in substantially aligned relation, although the apertures 48 in adjacent flanges can be brought into alignment by moving the flanges 34 and 36 into offset positions. In this regard, the apertures 48 in the adjacent flanges 34 and 36 are preferably offset by approximately the difference between the widths of the annular grooves 60 and 62 and the widths of the first and second ridges 38 and 40, respectively, assuming that the diameter of the bolts 18 is not significantly less than the diameter of the apertures 48. Generally, it has been found that couplings which are constructed so that the apertures in adjacent flanges 34 and 36 are offset by between approximately 0.110 inch and 0.200 inch can be effectively utilized for most applications, although other embodiments of the coupling of the subject invention wherein the apertures 48 in adjacent flanges 38 and 40 are offset by greater or lesser amounts are contemplated. In any event, the precise amount by which the apertures 48 are offset depends on the amount of relative movement between the adjacent flanges 34 and 36 required to bring the ridges 38 and 40 into engagement with the edges of the grooves in the pipe sections 24 and 26.

The fastening assemblies 16 comprise the threaded bolts 18 and the nuts 20, and they are operative for securing the coupling segments 12 and 14 in assembled relation as illustrated. The bolts 18 preferably comprise track bolts having rounded heads 54 and oval-shaped shoulders 56, and the nuts 20 are of conventional configuration. The bolts 18 are assembled with the coupling segments 12 and 14 so that the oval shoulders 56 of the bolts 18 are nonrotatably received in the elongated apertures 48. Further, the apertures 48 and the shoulders 56 are preferably dimensioned to retain the bolts 18 against rotation and/or lateral or outward movement in the apertures 48.

The seal 22 is preferably of conventional configuration and it is preferably integrally molded from a suitable rubberized material. The seal 22 is dimensioned to be received in the inner channels 42 in the coupling segments 12 and 14, and it is formed so that it includes an inwardly opening interior cavity 58.

The pipe sections 24 and 26 preferably comprise conventional pipe sections of substantially equal diameter and they have annular grooves 60 and 62, respectively, formed therein which are spaced inwardly from the terminal ends of the pipe sections 24 and 26 by terminal end portions 64 and 66, respectively.

Figure 6:
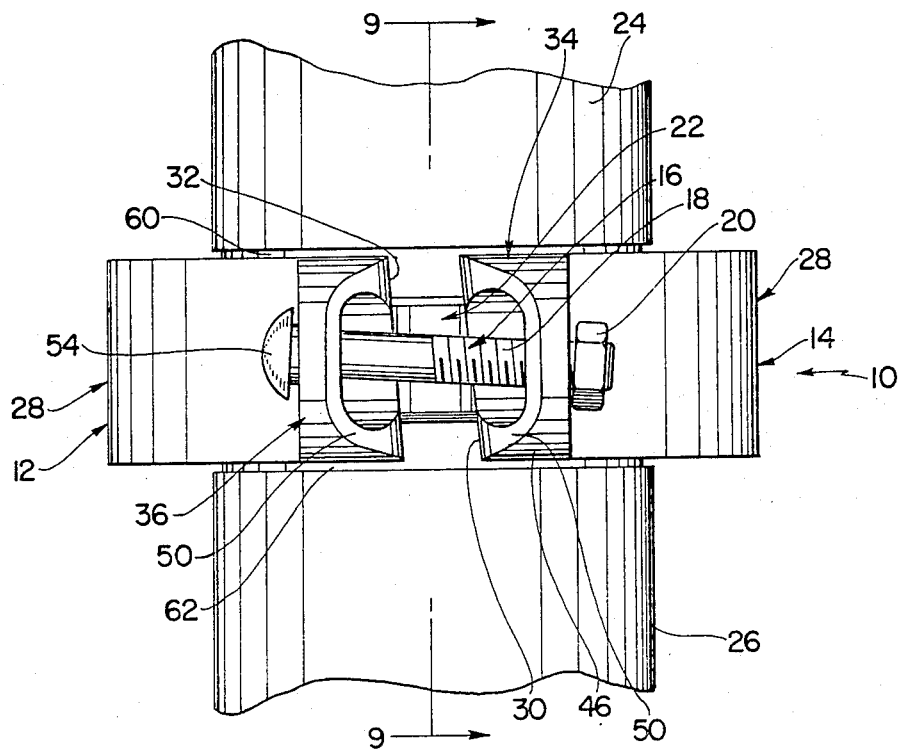
FIG. 6 is an elevational view of the coupling secured on a pair of pipe sections prior to tightening the fastening bolts.
Figure 7:
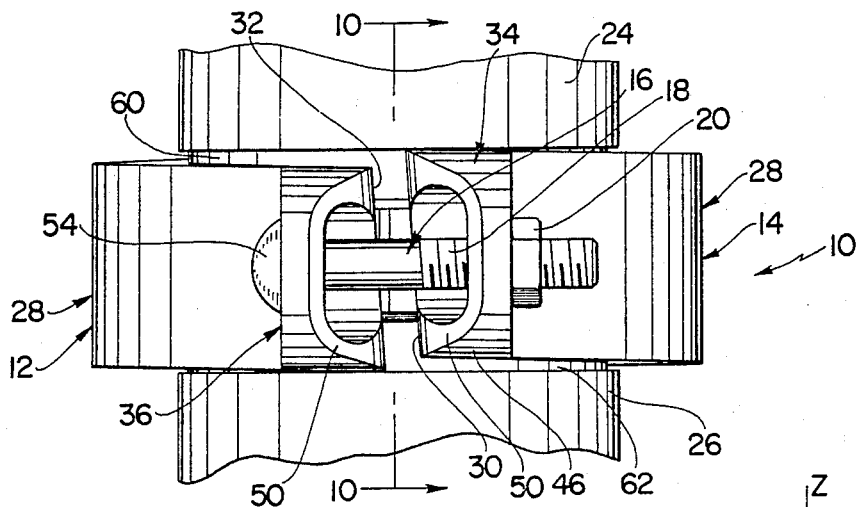
FIG. 7 is a similar view with the fastening bolts in partially tightened positions.
Figure 8:
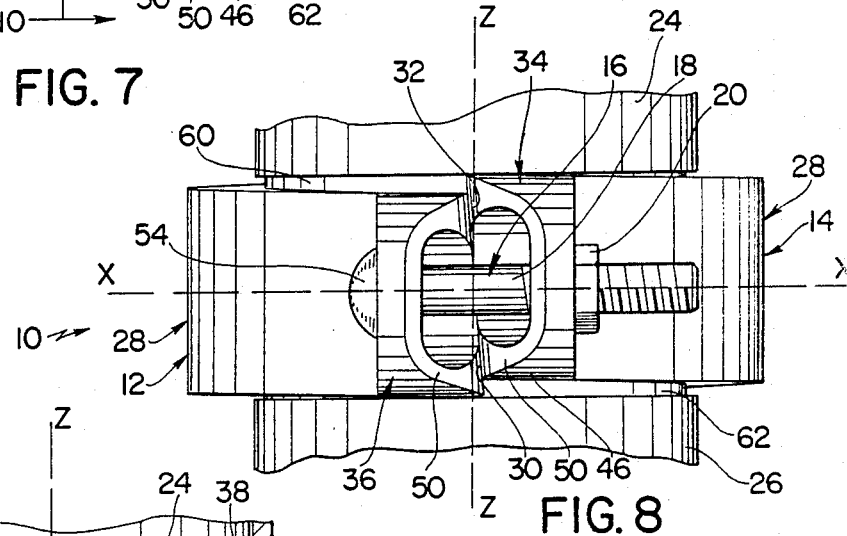
FIG. 8 is a similar view with the fastening bolts in fully tightened positions.
Figure 9:
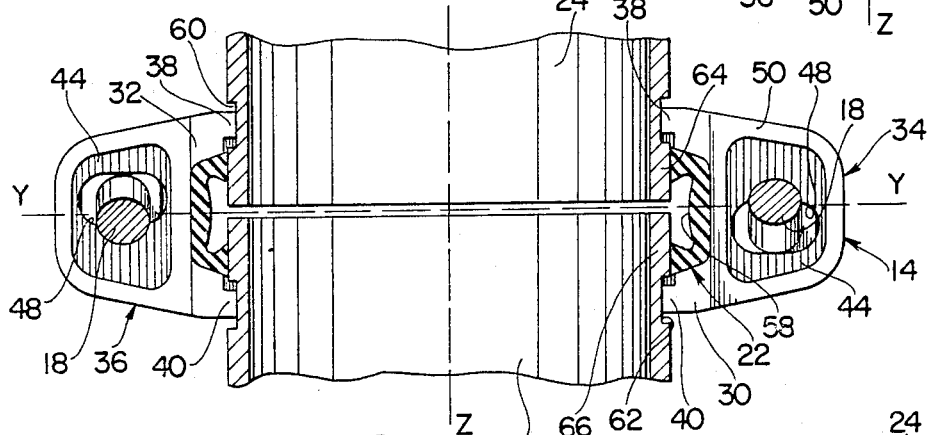
FIG. 9 is a sectional view taken along line 9—9 in FIG. 6.
Figure 10:
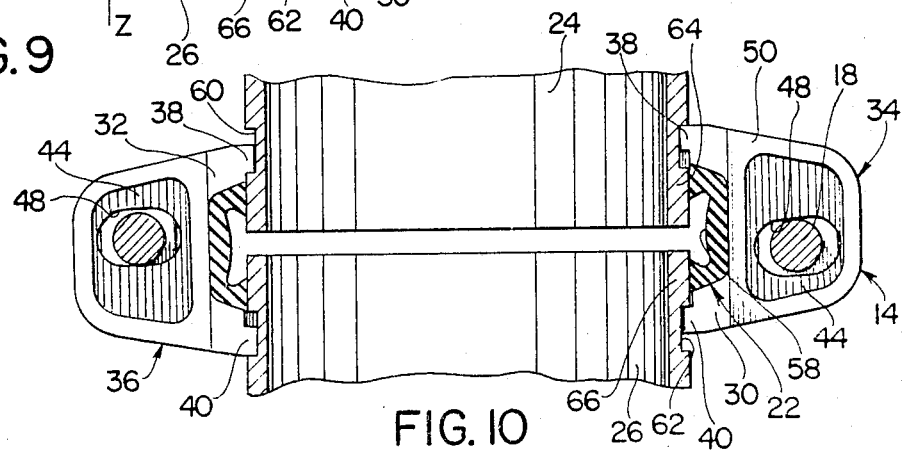
FIG. 10 is a sectional view taken along line 10—10 in FIG. 7.

As illustrated, the coupling 10 is receivable in substantially encircling relation on the pipe sections 24 and 26 for rigidly securing the pipe sections 24 and 26 in substantially aligned relation. In this regard, when the coupling 10 is assembled on the pipe sections 24 and 26, the pipe sections 24 and 26 are positioned so that the terminal end portions 64 and 66 thereof, respectively, are disposed in closely spaced relation, and the seal 22 is positioned so that it engages the outer surfaces of the terminal end portions 64 and 66 as illustrated in FIGS. 9 and 10. The coupling segments 12 and 14 are assembled on the pipe sections 24 and 26 so that the seal 22 is received in the inwardly facing channels 42 of the main portions 28 and so that the ridges 38 and 40 are received in the grooves 60 and 62. When the coupling segments 12 and 14 are assembled in this manner, the flanges 34 of the coupling segments 12 and 14 are positioned adjacent the flanges 36, and the bolts 18 are assembled through the apertures 48 in the adjacent pairs of flanges 34 and 36 and assembled with the nuts 20 for securing the adjacent pairs of flanges 34 and 36 together. As illustrated in FIGS. 6 and 9, when the coupling segments 12 and 14 are initially assembled on the pipe segments 24 and 26 prior to tightening the fastening assemblies 16, the adjacent flanges 34 and 36 are normally disposed in substantially aligned relation, and the ridges 38 and 40 are disposed in their respective channels 60 and 62. Further, the bolts 18 are disposed in angular cocked positions due to the offset positions of the apertures 48 and the heads 54 of the bolts 18 and the nuts 20 thereon and in cocked positions relative to their respective seating surfaces 51. However, as illustrated in FIG. 7, when the nuts 20 are tightened on the bolts 18, the flanges 34 and 36 are drawn into offset positions, and the apertures 48 in the flanges 34 and 36 are drawn into substantially aligned relation before the end faces 30 and 32 are drawn into engagement. Further, as the flanges 34 and 36 are drawn into aligned relation, the heads 54 and the nuts 20 are moved to seated position relative to the respective seating surfaces 51 thereof. As a result, the end portions of the coupling segments 12 and 14 are drawn into slightly misaligned positions wherein opposite end portions of the ridges 38 and 40 engage opposite side edges of the grooves 60 and 62 as illustrated in FIGS. 7 and 10 to restrain the pipe sections 24 and 26 against both relative axial movement and lateral or bending movement, as well as against relative rotation. In this regard, as the ridges 38 and 40 are drawn into engagement with the opposite side edges of the grooves 60 and 62, the pipe sections 24 and 26 are drawn into predetermined aligned, spaced positions where, in most instances, they are spaced apart by a slightly increased amount, as illustrated in FIG. 10. When the nuts 20 are thereafter tightened further, the ridges 38 and 40 on the coupling segments 12 and 14 are drawn into further pressurized engagement with the inner surfaces of the grooves 60 and 62, and finally the opposed end faces 30 and 32 of the coupling segments 12 and 14 are drawn into engagement with each other as illustrated in FIG. 8. In any event, once the fastening assemblies 16 have been tightened sufficiently to draw the end faces 30 and 32 into engagement with each other, the fastening assemblies 16 cooperate with the angular end faces 30 and 32 to secure the coupling 10 in a position wherein the adjacent flanges 34 and 36 are in offset relation. In this regard, it is important to note that the end faces 30 and 32 on the flanges 34 and 36 are not only disposed at acute angles to the Y-Z plane of the coupling, but they are also oriented such that once the flanges 34 and 36 have been drawn into the offset positions thereof and the end faces 30 and 32 have been thereafter drawn into engagement, forces which would tend to move the flanges 34 and 36 into aligned relation inherently cause stretching forces to be applied to the bolts 18. As a result, once the end faces 30 and 32 have been drawn into engagement, the opposite end portions of the ridges 38 and 40 are effectively secured in engagement with the opposite side edges of the grooves 60 and 62 to rigidly secure the pipe sections 24 and 26 together.

It should also be pointed out that while in most applications the coupling 10 is assembled with a pair of pipe sections 24 and 26 so that the ridges 38 and 40 engage both of the opposite side edges of the grooves 60 and 62, other embodiments of the coupling-pipe assembly wherein the ridges 38 and 40 only engage one side edge of each of the grooves 60 and 62 are also contemplated. In this instance, however, it is necessary for the coupling 10 and the pipe sections 24 and 26 to be constructed so that the ridges 38 and 40 engage the side edges of the grooves 60 and 62 which are defined by the inner ends of the end portions 64 and 66 in order to urge the adjacent terminal ends of the pipe sections 24 and 26 into engagement.

It is seen therefore that the instant invention provides an effective coupling for rigidly securing the ends of a pair of grooved pipe sections together in substantially aligned relation. In this regard, the coupling 10 is constructed so that the fastening assemblies 16 effectively draw the pairs of adjacent flanges 34, 36 into offset positions before the end faces 30 and 32 are drawn into engagement. Accordingly, as the fastening assemblies 16 are tightened, the opposite end portions of the ridges 38 and 40 are drawn into engagement with opposite sides edges of the grooves 60 and 62, and the ridges 38 and 40 are also drawn into pressurized engagement with the inner surfaces of the grooves 60 and 62. As a result, the pipe sections 24 and 26 are effectively restrained against both axial and lateral or bending movement as well as against relative rotation. Further, once the fastening assemblies 16 have been tightened sufficiently so that the end faces 30 engage the end faces 32, the coupling segments 12 and 14 are effectively secured in position on the pipe sections 24 and 26. Accordingly, for these, as well as the other reasons hereinabove set forth, it is seen that the coupling of the instant invention represents a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A coupling construction for securing the adjacent ends of a pair of pipe sections together, said pipe sections having substantially aligned central longitudinal axes and having annular grooves therein proximal the adjacent ends thereof, said grooves having opposite side edges which are substantially perpendicular to the longitudinal axes of their respective pipe sections, said coupling comprising a plurality of coupling segments each including an arcuate main portion, a pair of flanges extending outwardly from opposite ends of said main portion and axially spaced first and second engagement means extending inwardly from said main portion and extending substantially between the opposite ends thereof, said first and second engagement means being receivable in said annular grooves for securing said pipe sections together, and means for securing said coupling segments in substantially end-to-end encircling relation around said pipe sections, said coupling having a Z—Z axis which is substantially aligned with the longitudinal axes of said pipe sections when said coupling segments are secured in substantially end-to-end encircling relation around said pipe sections, each of said flanges having an aperture therethrough and including a fastening element seating surface around each aperture which faces substantially away from the adjacent flange, the apertures in adjacent flanges being offset from each other in a direction substantially parallel to the Z—Z axis of said coupling when adjacent flanges are in substantially aligned relation, said securing means comprising threaded nuts and bolts, said bolts being received in the apertures in adjacent flanges and being in cocked positions wherein the heads thereof and the nuts thereon are disposed at oblique angles to their respective seating surfaces when the respective flanges thereof are in aligned relation, said bolts moving toward aligned positions wherein the heads thereof and the nuts thereon are in seated positions relative to their respective seating surfaces as the respective nuts thereon are tightened, said nuts and bolts therefore being operative for first drawing the adjacent flanges into the offset positions wherein they are offset from each other in a direction substantially parallel to the Z—Z axis of said coupling and for then drawing the adjacent flanges together, the first and second engagement means of said coupling segments being urged against opposite side edges of the grooves in which they are received proximal opposite ends of the coupling segments thereof for rigidly securing said pipe sections together when the flanges on the adjacent ends of said coupling segments are secured in the offset positions thereof.

2. In the coupling construction of claim 1, said first and second engaging means comprising spaced first and second inwardly extending ridges, said ridges extending substantially continuously between the opposite ends of the coupling segments thereof.

3. In the coupling construction of claim 1, said coupling segments having end faces at opposite ends thereof, adjacent end faces being engageable in nonslidable relation for retaining the adjacent ends of said coupling segments in the offset positions thereof.

4. In the coupling construction of claim 3, said end faces being disposed at acute angles to a Y-Z plane of the coupling, said Y-Z plane being defined by said Z—Z axis and a Y—Y axis which is substantially perpendicular to said Z—Z axis and intersects the adjacent end faces when they are in engagement, said end faces being oriented such that relative sliding movement between an adjacent pair of flanges from the offset positions thereof toward the aligned positions thereof causes a stretching force to be applied to the respective fastening bolts of said coupling.

5. In the coupling construction of claim 4, said end faces being disposed at angles of between 3° and 7° to the Y-Z plane of the coupling.

6. In the coupling construction of claim 1, said flanges having recesses therein on the sides thereof facing away from the adjacent flanges, said recesses extending around the apertures in the flanges thereof, said bolts having head portions, the head portions of said bolts and the nuts of said nut-and-bolt assemblies being received in said recesses.

7. In the coupling construction of claim 1, said bolts being substantially nonrotatably received in the apertures in the flanges thereof.

8. A coupling construction for securing the adjacent ends of a pair of pipe sections together, said pipe sections having substantially aligned central longitudinal axes and having annular grooves therein proximal the adjacent ends thereof, said grooves having opposite side edges which are substantially perpendicular to the longitudinal axes of their respective pipe sections, said coupling comprising a plurality of coupling segments each including an arcuate main portion, a pair of flanges extending outwardly from opposite ends of said main portion and axially spaced first and second engagement means extending inwardly from said main portion and extending substantially between the opposite ends thereof, said first and second engagement means being receivable in said annular grooves for securing said pipe sections together, and means for securing said coupling segments in substantially end-to-end encircling relation around said pipe sections, said coupling having a Z—Z axis which is substantially aligned with the longitudinal axes of said pipe sections when said coupling segments are secured in substantially end-to-end encircling relation around said pipe sections, each of said flanges having an aperture therethrough and including a fastening element seating surface which faces substantially away from the adjacent flange, the apertures in adjacent flanges being offset from each other in a direction substantially parallel to the Z—Z axis of said coupling when adjacent flanges are in substantially aligned relation, said securing means comprising threaded nuts and bolts, said bolts being receivable in the apertures in adjacent flanges and being in cocked positions wherein the heads thereof and the nuts thereon are disposed at oblique angles to their respective seating surfaces when the respective flanges thereof are in aligned relation, said bolts moving toward aligned positions wherein the heads thereof and the nuts thereon are in seated positions relative to their respective seating surfaces as the respective nuts thereon are tightened, said nuts and bolts therefore being operative for first drawing the adjacent flanges into offset positions wherein they are offset from each other in a direction substantially parallel to the Z—Z axis of said coupling and for then drawing the adjacent flanges together, each of the first and second engagement means of said coupling segments being urged against at least one side edge of the groove in which it is received for securing said pipe sections together in substantially aligned relation when the flanges on the adjacent ends of said coupling segments are secured in the offset positions thereof.

* * * * *